United States Patent [19]

Madsen

[11] Patent Number: 5,331,479
[45] Date of Patent: Jul. 19, 1994

[54] CAPACITOR ASSISTED LOW VOLTAGE WRITE CIRCUIT

[75] Inventor: Timothy A. Madsen, Bloomington, Minn.

[73] Assignee: Seagate Technology, Inc., Scotts Valley, Calif.

[21] Appl. No.: 12,041

[22] Filed: Feb. 1, 1993

[51] Int. Cl.⁵ .................. G11B 5/02; G11B 5/03; G11B 5/09
[52] U.S. Cl. .................... 360/68; 360/46; 360/66; 360/67
[58] Field of Search ............ 360/46, 66, 67, 68

[56] References Cited

U.S. PATENT DOCUMENTS 4,647,988  3/1987  Takehara .................... 360/46
4,651,235  3/1987  Morita et al. ............... 360/46
5,067,032  11/1991  Ida ............................ 360/68

*Primary Examiner*—Donald Hajec
*Assistant Examiner*—T. N. Forbus, Jr.
*Attorney, Agent, or Firm*—Kinney & Lange

[57] ABSTRACT

A write circuit in a magnetic disc drive writes data to a magnetic disc based on a write signal received. The write circuit includes a magnetic write head, an H-switch, and a headroom assistance circuit. The headroom assistance circuit includes a voltage divider, a capacitor, and a charging circuit for charging and discharging the capacitor based on the write signals so that increased voltage appears across the magnetic recording write head during switching of the current polarity by the H-switch.

28 Claims, 4 Drawing Sheets

CAPACITOR ASSISTED LOW VOLTAGE WRITE CIRCUIT

BACKGROUND OF THE INVENTION

The present invention relates to a write circuit for a disc drive. More particularly, the present invention relates to a headroom assistance circuit for an H-switch in a write circuit.

A magnetic disc, for use in a computer disc drive, is a flat circular platter with a magnetic surface on which data can be stored by selective polarization of portions of the magnetic surface. The presence or absence of polarity transitions between the polarized portions represents particular binary values. The magnetic surface of the disc may be magnetized permanently with north-/south or south/north orientation by applying a magnetic field near the disc.

In a disc drive, the magnetic field for magnetizing the disc is created by a miniature horseshoe magnet which is suspended above the magnetically coated disc. The horseshoe magnet consists of a magnetic material surrounded by a conductive coil. The magnetic field is created by passing a current through the coil. The direction of the magnetic field is determined by the direction of the current through the coil. Thus, by changing the direction of the current through the coil, the host system can change the orientation of the magnetic field stored on the disc.

The density of the data stored on the disc is affected by how quickly the host system can change the direction of the current through the coil. Since the coil is basically an inductor, the rate of change of the current is approximated by the following equation:

$$V = \frac{Ldi}{dt}$$

or $$\frac{di}{dt} = \frac{V}{L}$$

Where V is the voltage across the coil, L is the inductance of the coil, and di/dt is the rate of change of current through the coil with respect to time. Thus, it can be seen that the rate of change of current through the coil is dependent on the voltage across the coil.

The current through the coil and the voltage across the coil are typically controlled by an H-switch connected to the magnetic write head. The H-switch consists of four transistors and various bias resistors. The transistors and resistors are balanced around the magnetic write head such that one transistor's emitter and another's collector are connected on each side of the magnetic write head. Depending upon the voltage applied to the H-switch, current flows from the emitter of one transistor through the magnetic write head and into the collector of another transistor on the opposite side of the magnetic write head. When the voltage applied to the H-switch is reversed, the current flows through a different pair of transistors in the opposite direction through the magnetic write head. The amount of voltage which can be placed across the magnetic write head is determined by the voltage supply available to the H-switch.

Present desktop computers provide a 5 volt supply which is sufficient to maintain a quick rate of change for the write head current. However, portable computers require write circuits which use lower voltages. When lower voltage supplies are used with present H-switch technology, the time needed for current changes (rise time) is greater, which degrades overwrite performance at higher data rates. Thus, the performance of computers is restricted by current H-switch technology.

SUMMARY OF THE INVENTION

The present invention is a write circuit for a magnetic disc drive. The write circuit writes data to a magnetic disc based on a write signal received from the host system. The write circuit contains a magnetic recording write head, an H-switch, and a headroom assistance circuit. The headroom assistance circuit assists the H-switch in switching the current polarity through the magnetic recording write head. The headroom assistance circuit includes a voltage divider, a capacitor, and a charging circuit. The charging circuit rapidly changes the voltage on one side of the capacitor. Since the voltage across the capacitor changes slowly, this causes the voltage on the opposite side of the capacitor to be changed likewise. The voltage change on the opposite side of the capacitor is used by the H-switch to cause a greater voltage to appear across the recording write head during write current transitions.

DETAILED DESCRIPTION OF THE PREFERRED EMBODIMENTS

1. Overview

Figure 1:
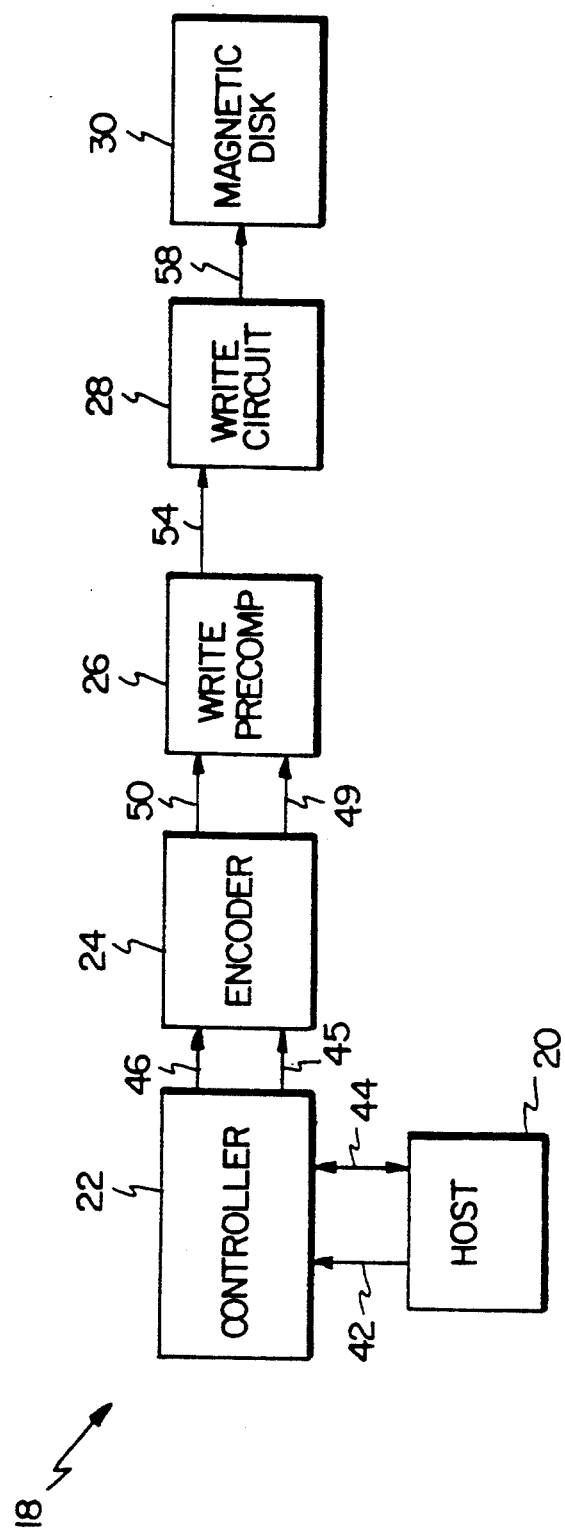
FIG. 1 is a block diagram of a write system of a disc drive.

FIG. 1 is a block diagram of a write system used in a disc drive. Write system 18 contains host 20, controller 22, encoder 24, write precomp circuit 26, write circuit 28, and magnetic disc 30. Host 20 is coupled to controller 22 and provides clock signal 42 and write data 44. Write data 44 is the binary data to be written to magnetic disc 30.

Controller 22 is coupled to host 20 and encoder 24. Controller 22 receives write data 44 and clock 42 from host 20 and outputs controller data 46 and clock 45 to encoder 24. Controller 22 performs all functions necessary to receive data from host 20.

Encoder 24 is coupled to controller 22 and write precomp circuit 26. Encoder 24 receives controller data 46 and clock 45 from controller 22 and outputs encoded data 50 and clock 49 to write precomp circuit 26.

Write precomp circuit 26 is coupled to encoder 24 and write circuit 28. Write precomp circuit 26 receives encoded data 50 and clock signal 49 from encoder 24 and outputs precompensated data 54 to write circuit 28. Write precomp circuit 26 shifts pulses in encoded data 50 to compensate for peak shifting caused by pulse crowding or other pattern dependent transition shifting.

Write circuit 28 is coupled to write precomp circuit 26 and is proximate magnetic disc 30. Write circuit 28 receives precompensated data 54 from write precomp circuit 26 and outputs magnetic field 58. Magnetic field 58 writes magnetic transitions on disc 30 which are indicative of the data to be stored on disc 30. Write circuit 28 changes the polarity of magnetic field 58 for each positive going edge in precompensated data 54.

Magnetic disc 30 is proximate write circuit 28. A small portion of magnetic disc 30 resides within magnetic field 58 and is magnetized to the orientation of magnetic field 58. Magnetic disc 30 rotates relative to write circuit 28. This causes different portions of magnetic disc 30 to be in the proximity of write circuit 28 at different times. Changes in the orientation of magnetic field 58 causes different portions of magnetic disc 30 to have different magnetic orientations. These transitions in magnetic orientation on magnetic disc 30 represent data written to the disc.

2. Write Circuit 28

Figure 2:
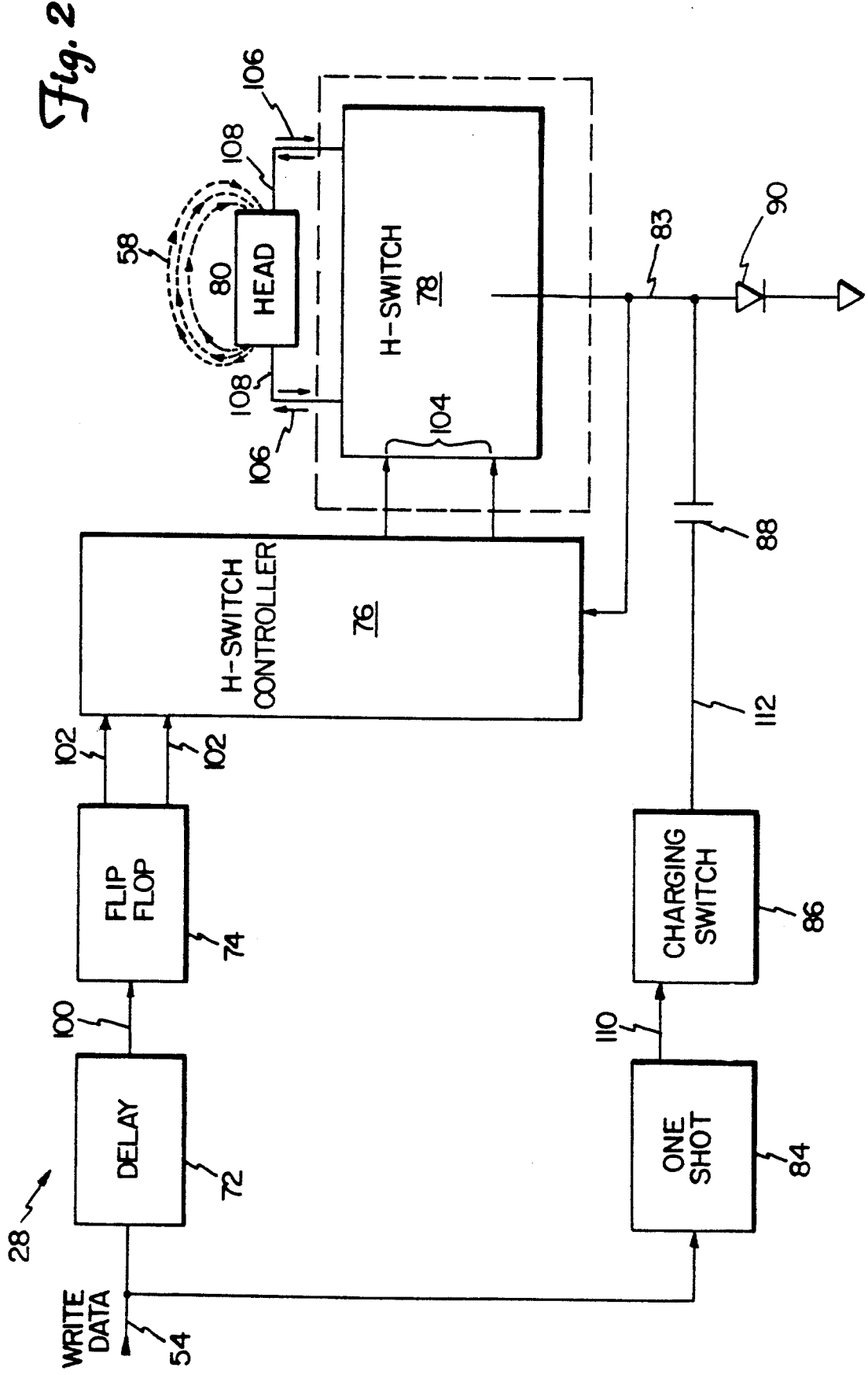
FIG. 2 is a more detailed block diagram of a write circuit used in the system of FIG. 1.

FIG. 2 is a more detailed block diagram of write circuit 28 of FIG. 1. Write circuit 28 comprises delay 72, flip-flop 74, H-switch controller 76, H-switch 78, write head 80, one-shot 84, charging switch 86, large capacitor 88, and diode 90.

Delay 72 is coupled to write precomp circuit 26 of FIG. 1, one-shot 84 and flip-flop 74. Delay 72 receives precompensated data 54 and outputs delayed data signal 100 to flip-flop 74. Delay 72 delays the positive edges of precompensated data 54 to properly time the switching of large capacitor 88 with the switching of the H-switch 78. This will be explained in greater detail later in the specification.

Flip-flop 74 is coupled to delay 72 and H-switch controller 76. Flip-flop 74 receives delayed data 100 from delay 72 and outputs flip-flop output 102 to H-switch controller 76. Flip-flop 74 creates flip-flop output 102 by forming a digital signal with a transition for each positive going transition in delayed data signal 100.

H-switch controller 76 is coupled to flip-flop 74, H-switch 78, and common reference 83. H-switch controller 76 receives flip-flop output 102 from flip-flop 74 and provides differential input voltage signal 104 to H-switch 78. H-switch controller 76 produces differential input voltage signal 104 by dividing the voltage of flip-flop output 102. Also, the common mode voltage of differential input voltage signal 104 is affected by common reference 83. This allows common reference 83 to control the biasing of H-switch 78.

H-switch 78 is connected to H-switch controller 76, write head 80, and common reference 83. H-switch 78 receives differential input voltage signal 104 from H-switch controller 76 and provides write head voltage 108 and write head current 106 to write head 80. H-switch 78 produces write head voltage 108 and write head current 106 based on differential input voltage signal 104. The polarity of the differential input voltage signal 104 determines the polarity of write head voltage 108 and the direction of write head current 106.

Write head 80 is connected to H-switch 78 and is proximate magnetic disc 30 of FIG. 1. Write head 80 receives write head voltage 108 and write head current 106 from H-switch 78 and produces magnetic field 58. Magnetic field 58 is proportional to write head current 106. Magnetic field 58 is used to magnetize portions of magnetic disc 30 of FIG. 1.

One-shot 84 is connected to write precomp circuit 26 of FIG. 1, delay 72, and charging switch 86. One-shot 84 receives precompensated data 54 from write precomp circuit 26 and provides one-shot signal 110 to charging switch 86. One-shot signal 110 contains one pulse for each positive going transition in precompensated data 54.

Charging switch 86 is connected to one-shot 84 and large capacitor 88. Charging switch 86 receives one-shot signal 110 from one-shot 84 and provides capacitor voltage signal 112 for large capacitor 88. For each pulse received from one-shot 84, charging switch 86 quickly changes capacitor voltage 112 from the supply voltage to ground.

Large capacitor 88 is connected to charging switch 86 and common reference 83. In steady state, common reference 83 is at a positive reference potential equal to the diode on-voltage across diode 90. When capacitor voltage 112 changes from the supply voltage to ground, common reference 83 is driven substantially below ground, until current flowing from H-switch 78 to common reference 83 has accumulated significant charge in large capacitor 88. Ideally, the voltage at common reference 83 is pulled down, below its nominal potential, by an amount equal to the power supply voltage. However, the resistance of the charging switch 86 and the large capacitor 88 will typically reduce the actual voltage change measured at common reference 83.

Diode 90 is connected to common reference 83 and ground. Diode 90 blocks the flow of current from ground into common reference 83. This assures that when capacitor voltage 112 changes from the supply voltage to ground, the current drawn to large capacitor 88 does not come from ground, but rather from the H-switch controller 76 and the H-switch 78.

As shown by this description, the present invention uses one-shot 84, delay 72, charging switch 86, large capacitor 88, diode 90, and H-switch controller 76 to develop a larger voltage drop across the magnetic write head at transition. This voltage drop is created when the buffered one-shot, one-shot 84 together with charging switch 86, drives the capacitor voltage on capacitor 88 from the supply voltage to ground and thereby drives the common reference 83 below ground. The use of the large capacitor 88 to give a momentary increase in voltage across the magnetic write head 80 allows lower voltage power supplies to be used in disc drives while maintaining the switching time of the write current in the magnetic write head.

3. Write Circuit 28 In Detail

Figure 3:
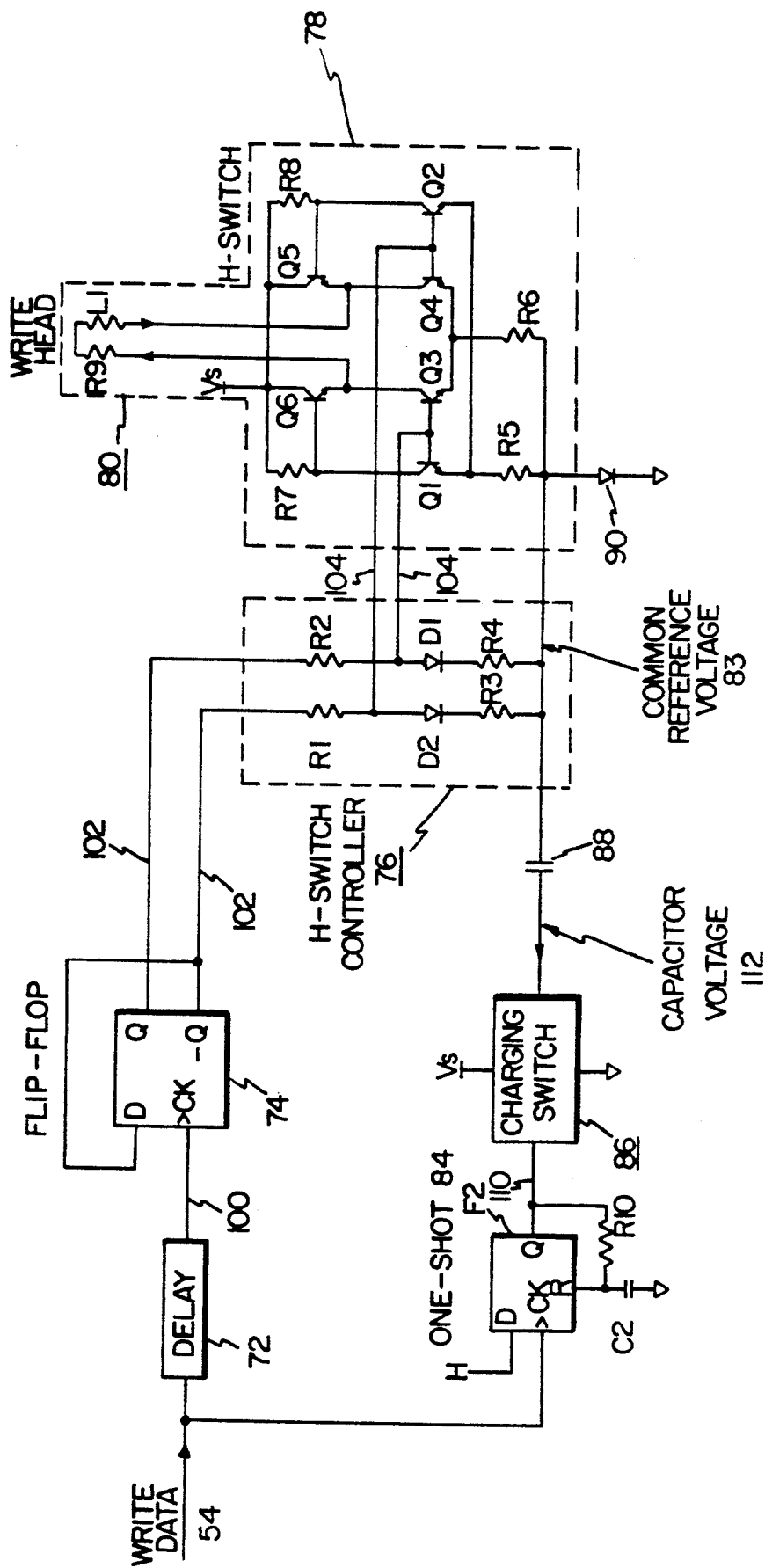
FIG. 3 is a circuit diagram of a write circuit used in the system of FIG. 1.

FIG. 3 is a more detailed circuit diagram of write circuit 28 in the system of FIGS. 1 and 2. Elements shown in FIG. 3 that are similar to those shown in FIG. 2 are correspondingly numbered.

a. Operation Of Delay 72 And Flip-flop 74

Flip-flop 74 is a D flip-flop and has data input D, output Q, inverse output $\overline{Q}$, and clock input CK. Data input D is connected to inverse output $\overline{Q}$ and clock input CK is connected to the output of delay 72. Clock input CK receives delayed data signal 100 from delay 72. Inverse output $\overline{Q}$ is connected to data input D and H-switch controller 76. Output Q is connected to H-switch controller 76.

Delay 72 delays the precompensated data 54 to flip-flop 74. D flip-flop 74 uses the delayed data signal 100 as its clock signal. A positive going transition in the clock signal will cause the output Q to switch to the value at data input D. The two possible values for output Q and inverse output $\overline{Q}$ are a logical high voltage, $V_Q$, and a logical low voltage, nearly zero. In addition, output Q and inverse output $\overline{Q}$ are never the same value. Since data input D is connected to the inverse output $\overline{Q}$, the value at data input D just before transition will always be the opposite of output Q. Thus, each time the clock input CK receives a positive going pulse, output Q switches to its complimentary value. Therefore, every transition in output Q represents a positive going pulse in precompensated data 54.

b. H-switch controller 76, H-switch 78, and Write head 80 In Detail

H-switch controller 76 includes resistors R1 and R2, diodes D1 and D2, and resistors R3 and R4. H-switch 78 includes resistors R5, R6, R7, R8 and transistors Q1, Q2, Q3, Q4, Q5, and Q6.

Resistor R1 of H-switch controller 76 has a first side and a second side. The first side is connected to inverse output $\overline{Q}$ of flip flop 74. The second side is connected to the anode of diode D2 and the bases of transistors Q2 and Q4 of H-switch 78. Resistor R2 has a first side and a second side. The first side is connected to output Q of flip flop 74. The second side is connected to the anode of diode D1, and the bases of transistors Q1 and Q3 of H-switch 78. Diode D1 has an anode and a cathode. The anode is connected to resistor R2 and the bases of transistors Q1 and Q3. The cathode is connected to resistor R4. Diode D2 has an anode and a cathode. The anode is connected to resistor R1 and the bases of transistors Q2 and Q4. The cathode of diode D2 is connected to resistor R3. Resistor R4 has a first side and a second side. The first side is connected to the cathode of diode D1. The second side is connected to common reference 83. Resistor R3 has a first side and a second side. The first side is connected to the cathode of diode D2. The second side is connected to common reference 83.

Resistors R1 and R2 have identical resistances. Resistors R3 and R4 also have identical resistances although probably different from resistors R1 and R2.

Resistor R7 has a first side and a second side. The first side is connected to power supply $V_S$. The second side is connected to the base of transistor Q6 and the collector of transistor Q1. Transistor Q6 has a base, a collector and an emitter. The base of transistor Q6 is connected to resistor R7 and the collector of transistor Q1. The collector is connected to power supply $V_S$ and the emitter is connected to write head 80 and the collector of transistor Q3.

Resistor R8 has a first side and a second side. The first side is connected to power supply $V_S$. The second side is connected to the base of transistor Q5 and the collector of transistor Q2. Transistor Q5 has a base, a collector and an emitter. The base is connected to resistor R8 and the collector of transistor Q2. The collector is connected to power supply $V_S$ and the emitter is connected to write head 80 and the collector of transistor Q4.

Transistor Q1 has a base, a collector and an emitter. The base is connected to the base of Q3, the anode of diode D1 and resistor R2. The collector is connected to resistor R7 and the base of transistor Q6 and the emitter is connected to resistor R5 and the emitter of transistor Q2.

Transistor Q3 has a base, a collector and an emitter. The base is connected to the base of transistor Q1, the anode of diode D1 and resistor R2. The collector is connected to the emitter of transistor Q6 and write head 80, and the emitter is connected to the emitter of transistor Q4 and resistor R6.

Transistor Q2 has a base, a collector and an emitter. The base is connected to the base of transistor Q4, the anode of diode D2, and the resistor R1. The collector is connected to resistor R8 and the base of transistor Q5 and the emitter is connected to resistor R5 and the emitter of transistor Q1.

Transistor Q4 has a base, a collector and an emitter. The base is connected to the base of transistor Q2, the anode of diode D2, and resistor R1. The collector is connected to write head 80 and the emitter of transistor Q5. The emitter is connected to the emitter of transistor Q3 and resistor R6.

Resistor R5 has a first side and a second side. The first side is connected to the emitters of transistors Q1 and Q2. The second side is connected to common reference 83.

Write head 80 has a first side and a second side. The first side is connected to the emitter of transistor Q6 and the collector of transistor Q3. The second side is connected to the emitter of transistor Q5 and the collector of transistor Q4. The resistance of write head 80 is represented by resistor R9 and its inductance is represented by inductor L1.

Resistor R6 has a first side and a second side. The first side is connected to the emitters of transistors Q3 and Q4. The second side is connected to common reference 83.

c. Operation Of H-switch controller 76, H-switch 78, and Write head 80

The resistor pairs R1, R3 and R2, R4 act as a voltage divider to divide the voltage provided between the output 102 of flip flop 74 and common reference 83. Diodes D1 and D2 each provide one diode on-voltage when current is flowing through them, which is intended to match the individual base-emitter on-voltages of transistors Q1, Q2, Q3, and Q4. The divided voltage is provided as the differential voltage input signal 104 to H-switch 78.

Resistor pairs R1, R3 and R2, R4 are chosen such that the voltage across resistor R6 in H-switch 78, in steady state, is above a minimum voltage VMIN. This value is typically around 0.35 volts. This minimum voltage reduces current variations through the write head 80 due to temperature changes.

Depending on whether Q is in a logic high state or inverse output $\overline{Q}$ is in a logic high state, significant current will flow through either resistors R2 and R4, diode D1, and transistor Q3 or through resistors R1 and R3, diode D2 and transistor Q4, but not through both sets of circuit elements simultaneously. Depending on which set of elements is conducting current, the voltage drop across the base emitter junction of Q3 or Q4, is approximately equal to the diode on-voltage across diode D1 or diode D2. Thus, the voltage across resistor R3 or R4 is approximately equal to the voltage across resistor R6. Therefore, to ensure that the voltage across resistor R6 is at or above $V_{MIN}$, resistor pairs R1, R3 and R2, R4 should be chosen such that the steady state on-voltage across resistors R3 and R4 is at or above $V_{MIN}$. Since the ratios of resistor R1 to resistor R3 and resistor R2 to R4 are equal to the ratio of the on-voltage across resistor R1 to the on-voltage across resistor R3, the values for resistors R1, R3 and R2, R4 are chosen from the following equation:

$$\frac{R1}{R3} = \frac{R2}{R4} = \frac{V_Q - V_D - V_{90} - V_{MIN}}{V_{MIN}}$$

Where:
- $V_Q$ equals the high voltage from flip flop 74;
- $V_D$ equals the on-voltage across diode D1 (or D2);
- $V_{90}$ equals the voltage drop across diode 90; and
- $V_{MIN}$ is the minimum voltage needed across resistor R6.

In the preferred embodiment, the resistance of resistor R1 is equal to the resistance of resistor R2, and the resistance of resistor R3 is equal to the resistance of resistor R4.

When output Q of flip flop 74 is at $V_Q$, inverse output $\overline{Q}$ is close to zero. The voltage at the anode of diode D1 is substantially greater than zero, and the voltage at the anode of diode D2 is close to zero. The voltage at the anode of diode D1 causes transistors Q1 and Q3 to turn on. A lack of positive voltage at the anode of diode D2 causes transistors Q2 and Q4 to remain off. When transistor Q1 turns on, it draws current through resistor R7. The current flows through resistor R7 and causes a voltage drop across resistor R7. This causes the voltage at the collector of transistor Q1 to drop below the voltage needed to turn on transistor Q6. Therefore, transistor Q6 is off.

Since transistors Q2 and Q4 are both off, no current flows into the collector and out the emitter of either of these transistors. With no current flow through transistor Q2 there is very little current flow through resistor R8. This causes the voltage at the collector of transistor Q2 to be nearly at the voltage supply $V_S$. Since this voltage is at the base of transistor Q5, transistor Q5 is on.

The combination of having both transistors Q3 and Q5 on and transistors Q4 and Q6 off causes current to flow into the collector and out of the emitter of transistor Q5, through write head 80, into the collector of transistor Q3 and out the emitter of transistor Q3. This current finally passes through resistor R6 and diode 90.

When output Q of flip flop 74 is nearly zero, inverse output $\overline{Q}$ is at $V_Q$, the voltage at the anode of diode D2 is substantially greater than zero, and the voltage at the anode of diode D1 is close to zero. The voltage at the anode of diode D2 causes transistors Q2 and Q4 to turn on. A lack of positive voltage at the anode of diode D1 causes transistors Q1 and Q3 to remain off. When transistor Q2 turns on, it draws current through resistor R8. The current flows through resistor R8 and causes a voltage drop across resistor R8. This causes the voltage at the collector of transistor Q2 to drop below the voltage needed to turn on transistor Q5. Therefore, transistor Q5 is off.

Since transistors Q1 and Q3 are both off, no current flows in the collector and out the emitter of either of these transistors. With no current flow through transistor Q1 there is very little current flow through resistor R7. This causes the voltage at the collector of transistor Q1 to be nearly at the supply voltage $V_S$. Since this voltage is at the base of transistor Q6, transistor Q6 is on.

The combination of having both transistors Q4 and Q6 on and transistors Q3 and Q5 off causes current to flow into the collector and out of the emitter of transistor Q6, through write head 80, into the collector of transistor Q4 and out of the emitter of transistor Q4. This current finally passes through resistor R6 and diode 90.

d. One-shot 84 In Detail

One-shot 84 includes D flip-flop F2, capacitor C2, and resistor R10. D flip-flop F2 has data input D, clock input CK, reset input R, and output Q. Clock input CK is connected to write precomp circuit 26 and receives precompensated data 54. Input D is connected to a logic high voltage H. Output Q is connected to resistor R10 and charging switch 86. Reset input R is connected to capacitor C2 and resistor R10.

Capacitor C2 has a first side and a second side. The first side is connected to resistor R10 and reset input R of D flip-flop F2. The second side is connected to ground. Resistor R10 has a first side and second side. The first side is connected to reset input R of D flip-flop F2 and capacitor C2. The second side is connected to output Q of D flip-flop F2 and charging switch 86.

e. Operation Of One-shot 84

A pulse in precompensated data 54 is received by clock input CK of D flip-flop F2. The pulse enables flip-flop F2 and output Q switches to the logic high voltage value of input D. Reset input R attempts to change to a digital value of one (a logic high), but is hindered by resistor R10 and capacitor C2. When reset input R does reach a digital value of one, flip-flop F2 is reset, and output Q switches to a digital value of zero.

Thus, one positive going pulse is created on output Q for each positive edge in precompensation data 54. The duration of this pulse is proportional to the (R10 * C2) time constant.

f. Charging Switch 86, Large Capacitor 88, And Diode 90 In Detail

Charging switch 86 has an input connected to the output Q of D flip-flop F2 and resistor R10, and an output connected to large capacitor 88. Charging switch 86 also has connections to the power supply $V_S$ and ground.

Large capacitor 88 has a first side and a second side. The first side is connected to the charging switch 86 and has a voltage referred to as the capacitor voltage 112. The second side is connected to common reference 83 and diode 90. Diode 90 (which is preferably a Schottky diode) has an anode and a cathode. The cathode is connected to ground and the anode is connected to common reference 83 and large capacitor 88.

g. Operation Of Charging Switch 86, Large Capacitor 88 And Diode 90

The one-shot signal from one-shot 84 has two states: pulse and non-pulse. In the non-pulse state, the charging switch 86 keeps the capacitor voltage 112 near the power supply voltage $V_S$. When one-shot signal 110 switches to a pulse state, charging switch 86 quickly reduces the capacitor voltage 112 to ground. This causes large capacitor 88 to drive the common reference 83 below ground. Ideally, the voltage at common reference 83 is pulled down, below its nominal potential, by an amount equal to the entire capacitor voltage change (i.e., the power supply voltage). However, the resistance of charging switch 86 and large capacitor 88 will typically reduce the actual voltage change measured at common reference 83.

When one-shot signal 110 switches back to a non-pulse state, the charging switch 86 quickly resets the capacitor voltage 112 to close to the supply voltage $V_S$.

This causes large capacitor 88 to reset common reference 83 to its nominal value of $V_{90}$.

Since the input signal to the H-switch 78 is delayed by delay 72, the described voltage change at common reference 83, begins just before the transition of current in the H-switch. This allows H-switch 78 to provide a larger voltage across the write head during write current transitions, which reduces the switching time of the write current. This allows computers to use lower voltage power supplies, which decreases total power consumption, and permits the realization of smaller computers.

Figure 4:
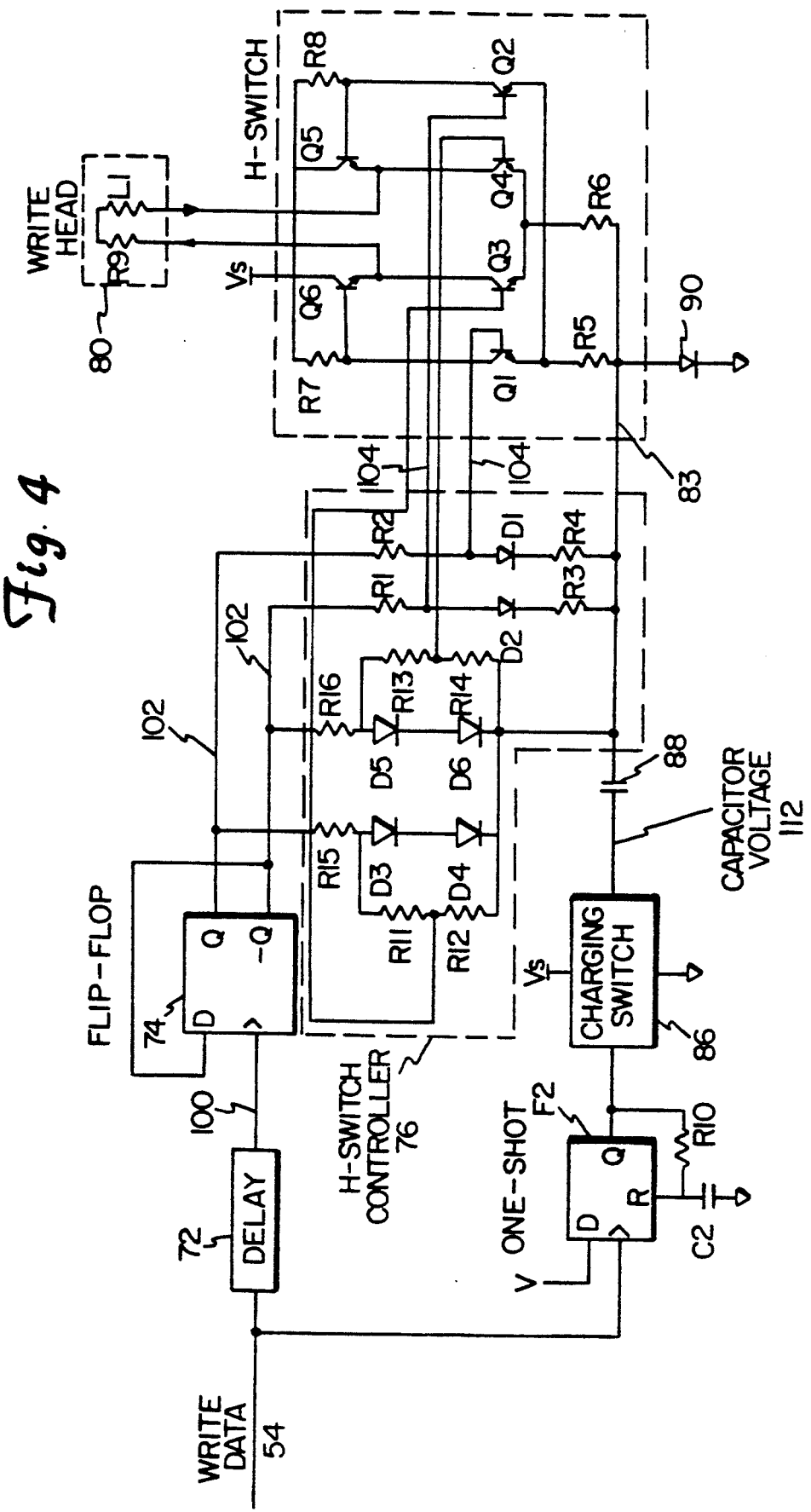
FIG. 4 is also a circuit diagram of a write circuit used in the system of FIG. 1.

FIG. 4 shows the preferred embodiment of the write circuit 28 shown in FIG. 2. This write circuit operates in the same manner as the circuit in FIG. 3, except that the H-switch controller 76 uses two voltage dividers to control the H-switch 78, with one of the voltage dividers being clamped.

The first voltage divider in H-switch controller 76 is the same as the divider found in FIG. 3. The only difference in FIG. 4 is that resistor R1 is now only connected to diode D2 and the base of transistor Q2. In addition, resistor R2 is only coupled to diode D1 and the base of transistor Q1. This means that the resistor pairs R1, R3 and R2, R4 only control the H-switch biasing transistors Q1 and Q2.

The new clamped voltage divider consists of resistors R11, R12, R13, R14, R15, and R16, and diodes D3, D4, D5, and D6.

Resistor R15 is connected to the Q output of flip-flop 74, diode D3 and resistor R11. Resistor R16 is connected to diode D5, resistor R13 and the inverse output $\bar{Q}$ of flip-flop 74. Diode D3 is connected to resistors R15 and R11 and diode D4. Diode D4 is connected to common reference 83 and diode D3. Diode D5 is connected to resistors R16 and R13 and diode D6. Diode D6 is connected to common reference 83 and diode D5. Resistor R11 is connected to resistors R15 and R12, diode D3 and the base of transistor Q3. Resistor R12 is connected to common reference 83, resistor R11 and the base of transistor Q3.

Resistor R13 is connected to resistors R16 and R14, diode D5 and the base of transistor Q4. Resistor R14 is connected to common reference 83, resistor R13 and the base of transistor Q4.

h. Operation Of The Clamped Voltage Divider

The clamped voltage divider is a balanced device so that the interaction and operation of resistors R15, R11, R12, and diodes D3 and D4 are the same as the interaction and operation of resistors R16, R13, R14, and diodes D5 and D6. Therefore, only the operation of resistors R15, R12, R11, and diodes D3 and D4 will be described.

Resistor R12 is chosen such that its resistance is equal to the resistance of resistor R15. Resistor R11 is chosen such that its resistance is one third the resistance of resistor R15. This relationship causes the voltage across R6 to remain at a nearly constant value of one half of the individual diode on-voltage associated with diodes D3, D4, D5, and D6. This can be seen from the fact that, because resistor R11 is one third of the value of resistor R12, and because there are a total of two diode on-voltages across resistors R11 and R12, resistor R11 will have a voltage of ½ of a diode on-voltage across it and resistor R12 will have a voltage of 1½ diode on-voltages across it. Assuming that there is a voltage of one diode on-voltage across the base-emitter junction of transistor Q3, that forces the voltage across resistor R6 to be one half of a diode on-voltage. This arrangement operates so that the voltage across resistor R6 is not dependant on the voltage of common reference 83, as it was for the circuit in FIG. 3.

In the embodiment of FIG. 3, a portion of the voltage change that appears at common reference 83 also appears across resistor R3 or R4, which directly increases the voltage across both resistors R5 and R6. The increased voltage across resistor R5 increases the voltage swing at the bases of transistors Q5 and Q6, which would otherwise directly limit the switching voltage applied across write head 80. However, the increased voltage across resistor R6 reduces the H-switch headroom directly, and increases the magnitude of the write current, slightly before, during, and slightly after each write current transition. This write current increase does not provide performance benefits, but reduces the effectiveness of large capacitor 88 by charging it faster than necessary. Thus, not all of the voltage change from switching capacitor 88 is actually applied across write head 80.

However, the clamped voltage divider shown in FIG. 4 does not allow the voltage across resistor R6 to increase. Rather, it remains nearly constant at approximately one half of a diode on-voltage. Thus, the entire voltage change caused by switching capacitor 88, at common reference 83, is applied across write head 80. This further increases the performance of the capacitor assisted low voltage write circuit.

CONCLUSION

The present invention develops an increased voltage across the magnetic write head during a transition in the write current signal applied to the write head. This increased voltage is created by switching a capacitor voltage so that the common reference voltage of the circuit is momentarily driven below ground. This momentary increase in voltage across the magnetic write head allows the disc drive system to use a lower voltage power supply, while maintaining the switching time of the write current in the magnetic write head. Using lower voltage supplies saves space, power, and money.

Although the present invention has been described with reference to preferred embodiments, workers skilled in the art will recognize that changes may be made in form and detail without departing from the spirit and scope of the invention.

What is claimed is:

1. A write circuit in a magnetic disc drive for receiving a write signal and for writing data based on the write signal to a magnetic disc, the write circuit comprising:

a magnetic recording write head;
   an H-switch, connected to the magnetic recording write head and having an H-switch input, for switching current polarity through the magnetic recording write head based on the write signal; and
   a headroom assistance circuit, connected to the H-switch input, for assisting the H-switch in switching the current polarity through the magnetic recording write head, the headroom assistance circuit, comprising:
   a voltage divider connected to the H-switch input for controlling the voltage across the magnetic recording write head based on the write signal;
   a capacitor connected to the voltage divider and the H-switch; and charging means, connected to the capacitor, for charging and discharging the capacitor, based on the write signal to increase the voltage appearing across the magnetic recording write head during switching of the current polarity by the H-switch.

2. The write circuit of claim 1 wherein the H-switch includes:
write head current driver means connected to the magnetic recording write head, for driving current through the magnetic recording write head; and
write head current control means connected to the write head current driver means, for controlling current through the magnetic recording write head.

3. The write circuit of claim 1 wherein the voltage divider includes:
transition means for receiving the write signal and producing a transition means output signal which changes voltage values based on corresponding selected changes of voltage values in the write signal; and
divisional means connected to the transition means and the H-switch, for dividing the transition means output signal to control the voltage across the magnetic recording write head, and to reduce current variations in the magnetic recording write head when the H-switch is not being switched.

4. The write circuit of claim 3 wherein the divisional means includes:
voltage clamping means for clamping a voltage across a portion of the H-switch at a fixed level so a greater portion of the increased voltage is applied across the magnetic recording write head during switching.

5. The write circuit of claim 3 wherein the transition means includes:
delay means for delaying the write signal and producing a delayed write signal; and
a flip-flop connected to the delay means, producing the transition means output signal which changes voltage states in response to a selected change of voltage states of the delayed write signal.

6. The write circuit of claim 1 wherein the charging means includes:
one-shot means for providing a one-shot signal based on the write signal;
a switch connected to the one-shot means and the capacitor, for switching voltage on one side of the capacitor based on the one-shot signal; and
ground current restriction means, connected to the capacitor, for restricting current flow from ground.

7. The write circuit of claim 6 wherein the one-shot means includes:
a write assistance one-shot for providing one pulse for each positive edge in the write signal.

8. The write circuit of claim 6 wherein the ground current restriction means includes a Schottky diode.

9. A write circuit in a disc drive for writing data to a magnetic disc based on a data signal received by the write circuit, the data signal having positive and negative going edges, the write circuit comprising:
delay means for delaying the data signal and producing a delayed data signal;
a transition circuit, connected to the delay means, producing a transition voltage based on the delayed data signal;
H-switch control means, connected to the transition circuit, producing at least one H-switch control signal based on the transition voltage;
an H-switch, connected to the H-switch control means, producing a write head current based on the H-switch control signal;
a magnetic write head, connected to the H-switch, producing a magnetic field based on the write head current; and
a write assistance circuit, connected to the H-switch control means and the H-switch, producing a write assistance voltage, the write assistance circuit including:
a capacitor for providing voltage pulses to the H-switch;
charging means, connected to the capacitor, for charging and discharging the capacitor; and
ground current restriction means, connected to the capacitor and to ground, for preventing current flow from ground.

10. The write circuit of claim 9 wherein the charging means includes:
one-shot means for providing a one-shot signal based on the data signal; and
a headroom assistance driver, connected to the one-shot means, for switching the voltage on one side of the capacitor based on the one-shot signal.

11. The write circuit of claim 10 wherein the one-shot means includes:
a headroom assistance one-shot for providing one pulse for each positive edge in the data signal.

12. The write circuit of claim 9 wherein the ground current restriction means includes a diode.

13. The write circuit of claim 9 wherein the ground current restriction means includes a Schottky diode.

14. The write circuit of claim 9 wherein the transition circuit includes:
a flip-flop, connected to the delay line means, producing a transition voltage on two output lines with one line in a positive voltage state and the other line in a no voltage state, the flip-flop switching the state of both lines for each positive going pulse in the delayed data signal.

15. The write circuit of claim 9 wherein the H-switch control means includes:
voltage clamping means for clamping a voltage across a portion of the H-switch to maintain a greater voltage across the magnetic write head during switching.

16. A write circuit in a disc drive for receiving a data signal and writing data represented by the data signal to a magnetic disc, the data signal having positive and negative going edges, the write circuit comprising:
a delay circuit for receiving the data signal, for delaying the data signal, and for providing a delayed data signal;
a transition circuit, connected to the delay circuit, for producing a voltage transition based on the delayed data signal;
H-switch control means, connected to the transition circuit, for producing at least one H-switch control signal based on the transition voltage;
an H-switch, connected to the H-switch control means, for producing a write head current based on the H-switch control signal;
a magnetic write head connected to the H-switch, for producing a magnetic field based on the write head current;

a one-shot circuit producing a one-shot signal based on the data signal;

a capacitor driver circuit, connected to the one-shot circuit, for producing a capacitor voltage based on the one-shot signal;

a headroom assistance capacitor, connected to the capacitor driver circuit, the H-switch, and the H-switch control means, for providing additional switching voltage across the magnetic head; and ground current restriction means, connected to the headroom assistance capacitor, the H-switch, the H-switch control means and ground, for restricting current flow from ground.

17. The write circuit of claim 16 wherein the transition circuit includes:

a flip-flop, coupled to the delay circuit, producing a transition voltage on two output lines with one line in a positive voltage state and the other line in a no voltage state, the flip-flop switching the states of both lines for each positive going pulse in the delayed data based on the delayed data signal.

18. The write circuit of claim 16 wherein the one-shot circuit includes:

a headroom assistance one-shot providing one pulse for each positive edge in the data signal.

19. The write circuit of claim 16 wherein the ground current restriction means includes a diode.

20. The write circuit of claim 16 wherein the ground current restriction means includes a Schottky diode.

21. A write circuit receiving a write signal having differing voltage values therein for representing write data and providing differing magnetic fields corresponding to these differing voltage values, the differing magnetic fields having values capable of magnetizing selected portions of a magnetic medium positioned proximate the write circuit, the write circuit comprising:

current switch control means for receiving the write signal and for providing a current switch control signal having changes of voltage values therein based on the differing voltage values of the write signal;

a current switch having a first terminal and a second terminal and being responsive to the changes in voltage values of the current switch control signal to change between a first mode and a second mode, the current switch providing a write head current having alternatively a first flow direction from the first terminal to the second terminal when the current switch is operating in the first mode and a second flow direction from the second terminal to the first terminal when the current switch is operating in the second mode;

a magnetic write head electrically coupled between the first and second terminals of the current switch and responsive to the write head current to provide the differing magnetic fields, the write head current establishing a voltage drop at the write head relative to a voltage at a reference node;

a capacitor having a first terminal and a second terminal, the second terminal being electrically coupled to the reference node; and charging control means electrically coupled to the first terminal of the capacitor for controlling charging and discharging of the capacitor based on the differing voltage values of the write signal to provide voltage pulses to selectively change the voltage at the reference node.

22. The write circuit of claim 21 wherein discharging the capacitor changes the voltage at the reference node to increase the voltage drop at the write head relative to the voltage at the reference node during the transitions between the first and second flow directions of the write head current.

23. The write circuit of claim 22 wherein the current switch has a resistive portion having two terminals such that one of the terminals of the resistance portion is electrically coupled to the reference node and wherein an increase in a voltage drop across the two terminals of the resistive portion reduces the increase of the voltage drop at the write head relative to the voltage at the reference node during transitions between the first and second flow directions of the write head current and wherein the write circuit further comprises:

voltage clamping means electrically coupled to the current switch for stabilizing the voltage drop across the two terminals of the resistive portion to allow a greater increase in the voltage drop at the write head relative to the voltage at the reference node during transitions between the first and second flow directions of the write head current.

24. The write circuit of claim 21 wherein the current switch control means includes:

delay means for delaying the write signal to produce a delayed write signal;

a flip-flop producing a transition signal which changes voltage states in response to a selected change of voltage states of the delayed write signal;

voltage division means for dividing the transition signal to provide two current switch control signals, each current switch control signal having changes in voltage values based on the changes in voltage states of the transition signal and wherein the current switch changes modes based on the changes in voltage values of the two current switch control signals.

25. The write circuit of claim 21 further comprising:

ground current restriction means for restricting current flow between a ground node and the reference node.

26. The write circuit of claim 25 wherein the ground current restriction means includes a Schottky diode.

27. The write circuit of claim 21 wherein a power supply supplies the write circuit with a power supply voltage and wherein the charging control means includes:

one-shot means for providing a one-shot signal having a stable voltage state and a pulse voltage state, the one-shot signal changing from the stable state to the pulse state based on the differing voltage values of the write signal, the one-shot signal staying in the pulse state for a selected duration;

voltage switch means responsive to the one-shot signal to apply a capacitor voltage to the first terminal of the capacitor, the value of the capacitor voltage being approximately at the level of the power supply voltage when the one-shot signal is in the stable state, the voltage switch changing the value of the capacitor voltage to a ground voltage level when the one-shot signal changes to the pulse state.

28. The write circuit of claim 21 wherein a power supply supplies the write circuit with a power supply voltage and wherein the write head has a first terminal and a second terminal and wherein the current switch includes:

a first transistor having a collector coupled to the power supply voltage and having an emitter coupled to the first terminal of the write head;

a second transistor having a collector coupled to the second terminal of the write head and having an emitter coupled to the reference node;

a third transistor having a collector coupled to the power supply voltage and having an emitter coupled to the second terminal of the write head;

a fourth transistor having a collector coupled to the first terminal of the write head and having an emitter coupled to the reference node; and wherein when the current switch operates in the first mode, the write head current flows from the emitter of the first transistor through the write head to the collector of the second transistor and when the current switch operates in the second mode, the write head current flows from the emitter of the third transistor through the write head to the collector of the fourth transistor.

* * * * *

UNITED STATES PATENT AND TRADEMARK OFFICE
CERTIFICATE OF CORRECTION

PATENT NO. : 5,331,479

DATED : July 19, 1994

INVENTOR(S) : TIMOTHY A. MADSEN

It is certified that error appears in the above-indentified patent and that said Letters Patent is hereby corrected as shown below:

Col. 10, line 3, delete "not", insert --not--

Col. 10, line 9, delete "both", insert --both--

Col. 10, line 9, delete "and", insert --and--

Signed and Sealed this

Twentieth Day of December, 1994

BRUCE LEHMAN

Attest:

Attesting Officer

Commissioner of Patents and Trademarks